UNITED STATES PATENT OFFICE.

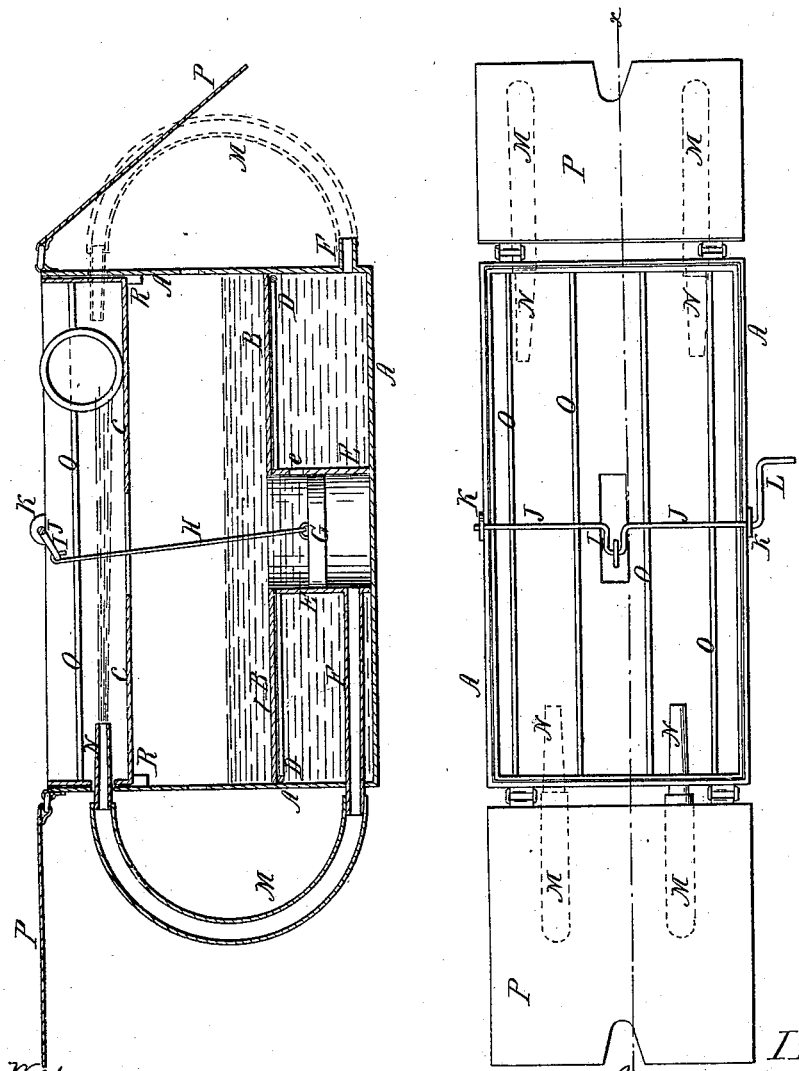

JONATHAN WHEELER, OF ATHOL, MASSACHUSETTS.

IMPROVED DISH-WASHING MACHINE.

Specification forming part of Letters Patent No. 53,511, dated March 27, 1866.

*To all whom it may concern:*

Be it known that I, JONATHAN WHEELER, of Athol, in the county of Worcester and State of Massachusetts, have invented a new and useful Improvement in Machine for Washing Dishes; and I do hereby declare that the following is a full, clear, and exact description thereof, which will enable others skilled in the art to make and use the same, reference being had to the accompanying drawings, in which—

Figure 1 is a vertical longitudinal section of my improved machine, taken through the line $x\,x$, Fig. 2. Fig. 2 is a top or plan view of the same, the cover or lids being open.

Similar letters of reference indicate like parts.

My invention has for its object to furnish a cheap and servicable machine by means of which dishes may be washed quickly and thoroughly and without danger of breakage; and it consists, first, in the combination, in a dish-washing machine, of an ordinary force-pump and flexible discharging-pipes with each other, and with the box or tank for withdrawing the water from the reservoir and discharging it with force upon the dishes; and, second, in the combination, in a dish-washing machine, of the tank or box in which the water is contained, with one or more horizontal partitions or troughs for supporting the dishes to be washed separate from the water in the lower part of the tank, and so constructed and arranged that the same water may be forced upon the dishes any consecutive number of times that may be desired or necessary for the thorough cleansing of the dishes, as hereinafter more fully described.

A is the box or tank which contains the water, and in which the operation of washing is performed. This tank is rectangular in form and is divided into three compartments by the horizontal partition B and the trough C.

The partition B rests upon a ledge or supports, D, attached to the sides of the tank A, as shown, and has a hole through its center leading into the cylinder E of the forcing-pump. This cylinder is securely attached to the bottom of the tank, and has pipes F leading from its lower part out through the end walls of the tank A. It has also holes $e$ in its upper part, through which the water may enter when the piston G is drawn up.

H is the piston-rod, which passes up through the hole in the partition B and through a slot in the bottom of the trough C and connects with the crank I.

The crank-shaft J, to which the crank I is attached, revolves in bearings K, attached to the upper edges of the sides of the tank A, as shown in the drawings, and is operated by the crank L.

M are rubber tubes attached to the ends of the pipes F and terminating in nozzles N.

O are wires or slats extending lengthwise of the trough C from end to end, to support the plates and similar dishes upon their edges, so that they may be more conveniently acted upon by the injected water.

The trough C rests upon supports R attached to the corner of the box, as shown in Fig. 1.

In using the machine the nozzles N are inserted into holes formed in the ends of the tank A and leading into the upper compartment or trough, C, or into holes leading into the middle compartment, according as the dishes to be washed may have been placed in the one or the other of these compartments. Then, by operating the crank L, the water is pumped or forced through the pipes F and tubes M and discharged upon the dishes, thoroughly washing them. By changing the direction of the nozzles the water may be made to strike the dishes at any desired angle, thus insuring their being thoroughly washed.

Pipes and stop-cocks may be attached to the lower part of the tank A, for convenience in drawing off and renewing the water in said tank when desired.

The lids or covers P are hinged to the upper-end edges of the tank A, as shown in the drawings, and are slotted, as shown, for the passage of the crank I and piston-rod H.

I claim as new and desire to secure by Letters Patent—

1. The combination, in a dish-washing machine, of an ordinary force-pump, E G H, and flexible discharge-pipes M, with each other, and with the box or tank A, substantially as described, and for the purpose set forth.

2. The combination, in a dish-washing machine, of the box or tank A, with one or more horizontal partitions or troughs B C, so constructed and arranged that the same water may be forced upon the dishes any consecutive number of times, substantially as described, and for the purpose set forth.

JONATHAN WHEELER.

Witnesses:
ANNA J. STEVENS,
ISAAC STEVENS.